United States Patent
Hamm et al.

(10) Patent No.: US 12,466,073 B2
(45) Date of Patent: Nov. 11, 2025

(54) METHOD FOR CALIBRATING A ROBOT

(71) Applicant: Siemens Aktiengesellschaft, Munich (DE)

(72) Inventors: Carsten Hamm, Eggolsheim (DE); Guido Seeger, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 114 days.

(21) Appl. No.: 18/293,157

(22) PCT Filed: Jun. 2, 2022

(86) PCT No.: PCT/EP2022/065010
§ 371 (c)(1),
(2) Date: Jan. 29, 2024

(87) PCT Pub. No.: WO2023/006283
PCT Pub. Date: Feb. 2, 2023

(65) Prior Publication Data
US 2025/0262768 A1    Aug. 21, 2025

(30) Foreign Application Priority Data
Jul. 30, 2021 (EP) .................................. 21188706

(51) Int. Cl.
*B25J 9/16* (2006.01)
(52) U.S. Cl.
CPC .................................. *B25J 9/1692* (2013.01)
(58) Field of Classification Search
CPC .................................................. B25J 9/1692
See application file for complete search history.

(56) References Cited

U.S. PATENT DOCUMENTS

2007/0276539 A1* 11/2007 Habibi .................. B25J 9/1612
  700/245
2008/0221733 A1* 9/2008 Morrow ............... G05B 19/401
  700/258

(Continued)

FOREIGN PATENT DOCUMENTS

DE   10 2015 015 094 A1   6/2016
DE   10 2016 011 653 A1   4/2017

(Continued)

OTHER PUBLICATIONS

PCT International Search Report and Written Opinion of International Searching Authority mailed Aug. 8, 2022 corresponding to PCT International Application No. PCT/EP2022/065010 filed Feb. 6, 2022.

Primary Examiner — Bhavesh V Amin
(74) Attorney, Agent, or Firm — Henry M. Feiereisen LLC

(57) ABSTRACT

A method for calibrating a robot is disclosed. A working space of the robot at least partly overlaps with a working space of a machining and/or production tool. The robot is moved such that a reference point of the robot is at a first position within the working space of the machining and/or production tool. A first position value for the robot at the first position is compared with a first position value for the machining and/or production tool at the position. If the first position value for the robot differs from the first position value for the machining and/or production tool, the first position value for the robot is corrected or the first position value for the machining and/or production tool is corrected such that the first position value for the robot and the first position value for the machining and/or production tool are the same.

15 Claims, 5 Drawing Sheets

(56) References Cited

U.S. PATENT DOCUMENTS

| | | | |
|---|---|---|---|
| 2008/0234863 A1 | 9/2008 | Pagel | |
| 2009/0118864 A1* | 5/2009 | Eldridge | B25J 9/1692 901/29 |
| 2011/0033254 A1* | 2/2011 | Abrams | B23Q 17/22 83/13 |
| 2014/0371905 A1* | 12/2014 | Eberst | G05B 19/4182 700/253 |
| 2015/0148958 A1* | 5/2015 | Primessnig | B25J 9/1676 700/255 |
| 2015/0217445 A1* | 8/2015 | Hietmann | B25J 9/1656 901/4 |
| 2016/0151915 A1 | 6/2016 | Nishi et al. | |
| 2017/0095930 A1 | 4/2017 | Warashina et al. | |
| 2017/0252919 A1* | 9/2017 | Zwinderman | B25J 9/1697 |
| 2018/0297204 A1* | 10/2018 | Krasny | B25J 9/163 |
| 2018/0369943 A1 | 12/2018 | Masuda et al. | |
| 2020/0316779 A1* | 10/2020 | Truebenbach | B25J 9/1607 |
| 2021/0069910 A1* | 3/2021 | Oleynik | F25D 23/028 |
| 2021/0205995 A1* | 7/2021 | Vu | B25J 9/1666 |
| 2021/0215811 A1* | 7/2021 | Couture | G05D 1/628 |
| 2021/0374569 A1* | 12/2021 | Jezewski | G06N 20/00 |
| 2022/0016762 A1* | 1/2022 | Ghanem | B25J 9/1687 |
| 2023/0123504 A1* | 4/2023 | Paolozzi | B25J 9/1676 15/3 |
| 2023/0211432 A1* | 7/2023 | Steinberg | B22F 10/22 219/76.14 |
| 2024/0308077 A1* | 9/2024 | Hamm | B25J 9/1692 |
| 2024/0326178 A1* | 10/2024 | Aas | B25J 9/0081 |

FOREIGN PATENT DOCUMENTS

| | | |
|---|---|---|
| EP | 1 152 212 81 | 1/2004 |
| EP | 3 418 838 A1 | 12/2018 |
| JP | 2011/048467 A | 3/2011 |
| WO | WO 2005/084895 A1 | 9/2005 |

\* cited by examiner

METHOD FOR CALIBRATING A ROBOT

CROSS-REFERENCES TO RELATED APPLICATIONS

This application is the U.S. National Stage of International Application No. PCT/EP2022/065010, filed Jun. 2, 2022, which designated the United States and has been published as International Publication No. WO 2023/006283 A1 and which claims the priority of European Patent Application, Serial No. 21188706.2, filed Jul. 30, 2021, pursuant to 35 U.S.C. 119 (a)-(d).

BACKGROUND OF THE INVENTION

The invention relates to a method for calibrating a robot.

Cooperation between a robot and a machine tool and/or production machine is, for example, advantageous when machining workpieces. The robot can, for example, be used to automate processes on a machine tool and/or production machine that would otherwise have to be carried out manually. These include loading and unloading processes.

However, this cooperation also enables the successful performance of work steps for which the machine tool and/or production machine itself is less suitable, in particular if the workpiece is to remain in its clamped position. These are, for example finishing steps, such as deburring.

However, the design-related lower accuracy of the robot's mechanics makes this cooperation difficult.

WO 2005/084895 A1 relates to a method for calibrating a working point for tools on industrial robots. EP 1 152 212 B1 describes a calibration method. The disadvantage here is that an optical measuring device is required for the measurement.

JP 2011 048467 A discloses a machining system with a machine tool controlled by a machine tool controller and a robot controlled by a robot controller to perform work on the machine tool. The machining system is provided with a data acquisition facility with data acquisition means for acquiring a set point P provided at a predetermined movable part of a robot in a robot coordinate system. The machining system further comprises measurement means for measuring the position of the set point P in the coordinate system of the machine tool and a relative relation deriving facility for deriving a relative relation between the robot coordinate system and the machine tool coordinate system based on the position data acquired by the data acquisition facility and the position data measured by the measurement facility.

EP 3 418 838 A1 discloses an electrical wire erosion machining system comprising: an electrode motion control unit for moving a wire electrode, while keeping the wire electrode parallel to the Z1 axis, to bring the wire electrode into contact with a reference piece, while keeping the wire electrode inclined with respect to the Z1 axis; an electrode position acquiring unit for acquiring a position of the wire electrode in an orthogonal X1 Y1 Z1 coordinate system when the wire electrode touches the reference piece; a piece position acquiring unit for acquiring a piece position of the reference piece in an orthogonal X2 Y2 Z2 coordinate system when the wire electrode touches the reference piece; and a relative positional relationship calculator for calculating a relative positional relationship between the coordinate systems, based on the acquired positions.

DE 10 2016 011 653 A1 discloses a robot system, which is inexpensive and can easily measure a position of a target point. The system stores feature quantities of an image of a target mark included in an acquired image as reference data when the target mark is placed at a known first target mark position at the robot coordinate system, and stores the first target mark position with respect to an arm tip as the position of the tool center point. The system compares the feature quantities obtained from the acquired image when the target mark is arranged at a second target mark position and the feature quantities of the reference data to make the arm tip move and calculates the second target mark position at the robot coordinate system based on a second robot position corresponding to the position of the arm tip after movement and the position of the tool center point.

DE 10 2015 015 094 A1 discloses a cooperation system consisting of a robot and a machine tool configured to obtain a coordinate transformation facility with high accuracy and a simple configuration with which a robot coordinate system is transformed into a machine coordinate system. A provisional coordinate system is defined by coordinate values of three calibration markers in a base coordinate system obtained by translating the machine coordinate system and a coordinate transformation matrix is calculated from the provisional coordinate system and the base coordinate system. The positions of the markers in the robot coordinate system are obtained by capturing the markers by a camera. Based on the three coordinate values in the robot coordinate system, a coordinate transformation matrix from the robot coordinate system to the provisional coordinate system is calculated, and a coordinate transformation matrix from the robot coordinate system to the base coordinate system is calculated based on the above two matrixes.

The invention is based on the object of improving cooperation between a robot and a machine tool and/or production machine.

SUMMARY OF THE INVENTION

The object is achieved by a method for calibrating a robot, wherein a working space of the robot at least partially overlaps a working space of a machine tool and/or production machine, wherein the robot is moved such that a reference point of the robot is located at a first position within the working space of the machine tool and/or production machine, wherein a first position value for the robot at the first position is compared with a first position value of the machine tool and/or production machine at the position, wherein, if the first position value for the robot differs from the first position value for the machine tool and/or production machine, the first position value for the robot is corrected or the first position value for the machine tool and/or production machine is corrected such that the first position value for the robot and the first position value for the machine tool and/or production machine are the same.

In a preferred embodiment, the first position value for the robot is corrected.

This is advantageous because machine tools and/or production machines usually have a higher level of accuracy than robots. Typical orders of magnitude for the absolute static accuracies that can be achieved in each case are approximately 1 mm for a robot, in particular an industrial robot, and approximately 10 µm for a machine tool and/or production machine.

The invention offers the advantage that there is no need for time-consuming and expensive calibration of the robot, in particular of a robot mechanism, for example by means of a 3D measuring means, which, for example, detects the position of a robot hand (advantageously with a tool center point (TCP for short)). The invention enables calibration to take place quickly and favorably.

The invention is also advantageous because calibration can be performed repeatedly during the operational lifetime.

This is a great advantage compared to the usual calibration used at present, which generally only takes place during commissioning.

This enables errors that accumulate over the operational lifetime to be rectified.

In one advantageous embodiment, a position value has a first coordinate, a second coordinate and a third coordinate.

Preferably, in this case, a coordinate system with three axes (x-axis, y-axis, z-axis) is used.

The use of an orthogonal coordinate system, in particular a Cartesian coordinate system, is typical, but not mandatory.

In one advantageous embodiment, the robot is moved such that the reference point of the robot is located at a second position within the working space of the machine tool and/or production machine, wherein a second position value for the robot at the second position is compared with a second position value for the machine tool and/or production machine at the second position, wherein, if the second position value for the robot differs from the second position value for the machine tool and/or production machine, the second position value for the robot is corrected or the second position value for the machine tool and/or production machine is corrected such that the second position value for the robot and the second position value for the machine tool and/or production machine are the same.

In a preferred embodiment, the first position value for the robot is corrected.

In one advantageous embodiment, a third position value is ascertained by means of interpolation or extrapolation based on the corrected first position value for the robot or for the machine tool and/or production machine and the corrected second position value for the robot or for the machine tool and/or production machine.

This provides a good estimate of those points for which no separate calibration is carried out.

The invention enables the accuracy of the robot in the region of the working space of the machine tool to be significantly increased, in particular the relative accuracy of the robot and the machine tool and/or production machine in relation to one another. In this case, a slight deterioration in the accuracy of the robot that may occur outside the working space of the machine tool can be accepted.

Therefore, the more accurate machine tool and/or production machine can serve as a measuring standard for the less accurate robot.

In one advantageous embodiment, the robot is moved such that the reference point of the robot is located at a plurality of positions within the working space of the machine tool and/or production machine.

The reference point is advantageously located in chronological order at the plurality of positions.

In other words, this advantageously means: first a point A is approached, followed by a point B. Then, for example, a point C can be approached.

Two or more positions are advantageous.

In one advantageous embodiment, the plurality of positions are arranged in a grid-like manner and/or in an array-like manner or the plurality of positions are arranged such that the positions are located at or close to critical points of a workpiece to be machined.

Critical points are, for example: corners and/or edges.

Corners and edges are advantageous because they are easy to measure.

A reference point is advantageously located where it is particularly important for the robot and machine tool and/or production machine to match one another.

One example of this is: to deburr an edge with the robot, it is advantageous to measure the edge.

Another example relates to joining components: if the robot inserts one component into another component, it is advantageous to measure the grooves, fits etc. provided for this purpose.

This has the advantage that critical points can be machined accurately.

In one advantageous embodiment, the reference point of the robot is arranged at an end effector of the robot.

The tool center point is advantageously located at an end effector of the robot.

Advantageously, the machine tool and/or production machine also has a reference point. This reference point can also be referred to as the tool center point. It is advantageously located at a piercing point of the tool, which is arranged on the spindle of the machine tool and/or production machine.

In one advantageous embodiment, the robot is moved such that the reference point of the robot is located at a position on a worktable of the machine tool and/or production machine, for example in a corner of the worktable of the machine tool and/or production machine.

In this case, advantageously, there are a plurality of points within the working space of the machine tool and/or production machine whose position is known. These include, for example, a surface of the worktable and also a position of a tool tip.

The tool can also be a particularly accurate measuring tool or a sensor probe.

The robot can approach a position or a point, for example by guiding a sensor probe or distance measuring device itself, or by establishing mechanical contact—this is achieved, for example, by deflecting the sensor probe of the machine tool and/or production machine or moving to a fixed stop—and recording the position values of its TCP in space (in particular by means of three coordinates x, y, z) at these points.

A difference from the position values in space that the machine tool and/or production machine measures for these points is advantageously considered to be an error in the robot mechanics that needs to be compensated at these points. Therefore, the machine tool and/or production machine can be used as a measuring means.

Errors that the machine tool and/or production machine itself has compared to an ideal error-free machine tool and/or production machine do not have any effect because the essential factor for the cooperation of the robot and the machine tool and/or production machine is their relative accuracy in relation to one another.

In one advantageous embodiment, the robot is moved such that the reference point of the robot is located on a spindle of the machine tool and/or production machine.

In one advantageous embodiment, contact with the worktable and/or the spindle is detected by a sensor probe present on and/or in an end effector of the robot.

The robot can approach the worktable until contact, preferably mechanical contact, is achieved. The surface of the table serves as a reference for comparing the two coordinate systems. After this first comparison, geometric inaccuracies in the robot mechanics can be corrected by approaching further known points on the machine tool and/or production machine.

In one advantageous embodiment, contact with the spindle is detected by a sensor probe present on and/or in the spindle.

Therefore, it is also possible for a sensor probe to be arranged in a tool holder of the machine tool and/or production machine.

Advantageously, for this purpose, the spindle of the machine tool and/or production machine has at least one sensor probe. The robot approaches this. The sensor probe advantageously detects a contact. A deflection of a dial gauge serves as a reference for comparing the coordinate systems of the robot and the machine tool and/or production machine.

After this first comparison, the spindle of the machine tool and/or production machine is advantageously moved to at least one further position and the process described is repeated.

If, as described above, the points sufficiently cover the common working space, these interpolation points can be used to interpolate or extrapolate errors at other unmeasured points in the working space. The resulting map advantageously serves to feed compensation values into the movement of the robot within the working space of the machine tool and/or production machine so that it hits the positions required from the perspective of the machine tool and/or production machine more accurately. As a result, for example, contours executed by the robot during machining processes are maintained much more precisely on the workpiece.

An alternative calculation of the measured position values consists in correcting the geometric characteristics of the robot mechanics, in particular an exact position of the joints in relation to one another, dimensions of the robot arm segments between the joints and/or load dependent deflection.

This is, for example, achieved by setting up an overdetermined system of equations based on the robot's kinematic transformation equations. One solution, for example, is achieved using a least squares method. This is particularly advantageous if a robot manufacturer has not corrected (as described above) mechanical inaccuracies (in particular deviations from the ideal geometry) ex works and the working space of the machine tool and/or production machine is large enough for all of the robot's joints to be sufficiently deflected so that errors can also become visible.

This can also increase the accuracy of the robot outside the working space of the machine tool and/or production machine.

If in this case position errors at measuring positions in the working space do not become zero, a second pass can be performed after the alternative calculation of the measured values in order to compensate this. For example, by approaching all the measuring positions again with the geometrically corrected robot mechanics and eliminating the remaining errors using the first-mentioned compensation method.

A comparison between the machine tool and/or production machine and robot is not restricted to the evaluation of Cartesian coordinates (x, y, z).

In a further advantageous embodiment of the invention, it is also possible for angular positions of the machine tool and/or production machine and robot in relation to one another to be ascertained and calculated. This means that not only positioning, but also orientation can be made to match.

The aforementioned object is also achieved by claim 12, i.e., a system for performing the method having a robot and a machine tool and/or production machine, arranged such that a working space of the robot at least partially overlaps a working space of a machine tool and/or production machine.

The aforementioned object is also achieved by claim 13, i.e., the use of a machine tool and/or production machine as a measuring tool, wherein the machine tool and/or production machine has a sensor probe, preferably on and/or in a spindle.

BRIEF DESCRIPTION OF THE DRAWING

The following describes and explains the invention in more detail with reference to the exemplary embodiments depicted in the figures, in which.

DETAILED DESCRIPTION OF PREFERRED EMBODIMENTS

Figure 1:
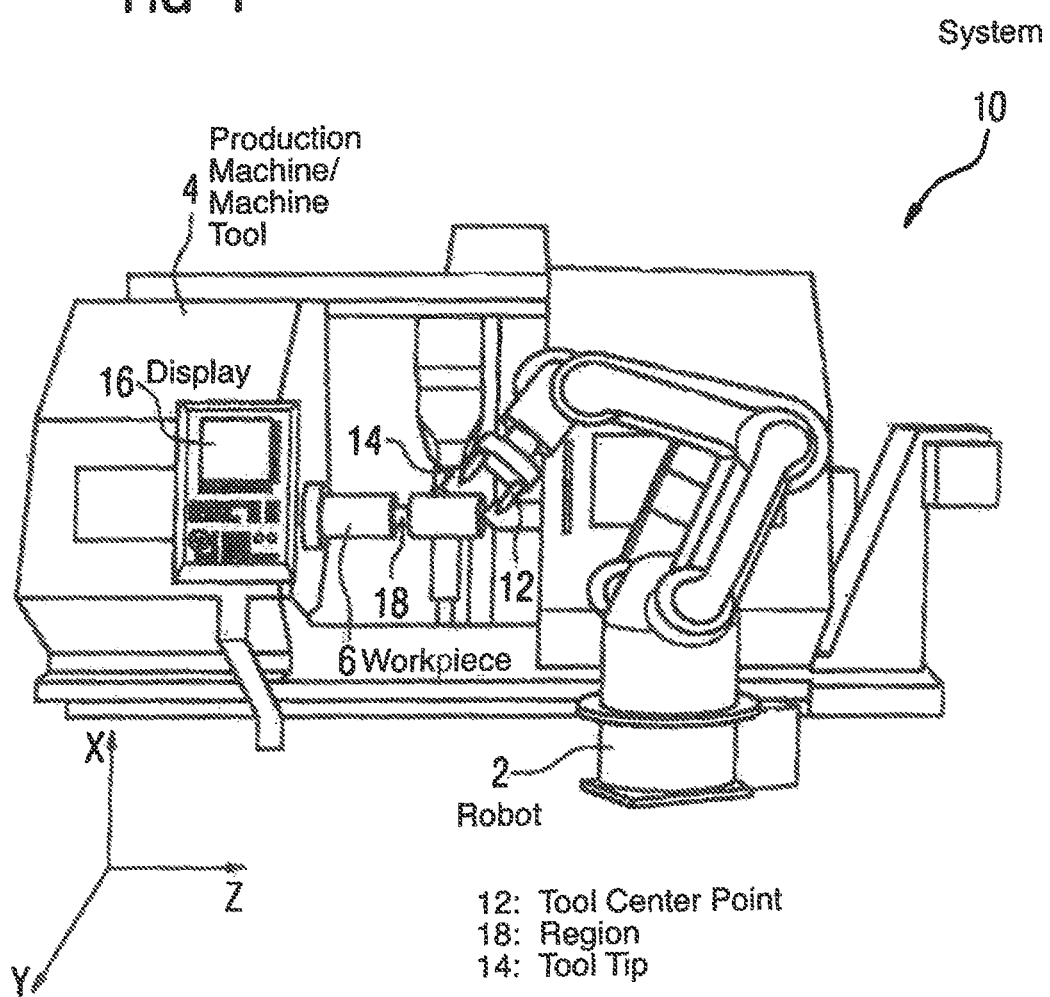
FIG. 1 shows a system having a robot and a machine tool and/or production machine.

FIG. 1 shows a system 10 having a robot 2 and a machine tool and/or production machine 4.

Figure 5:
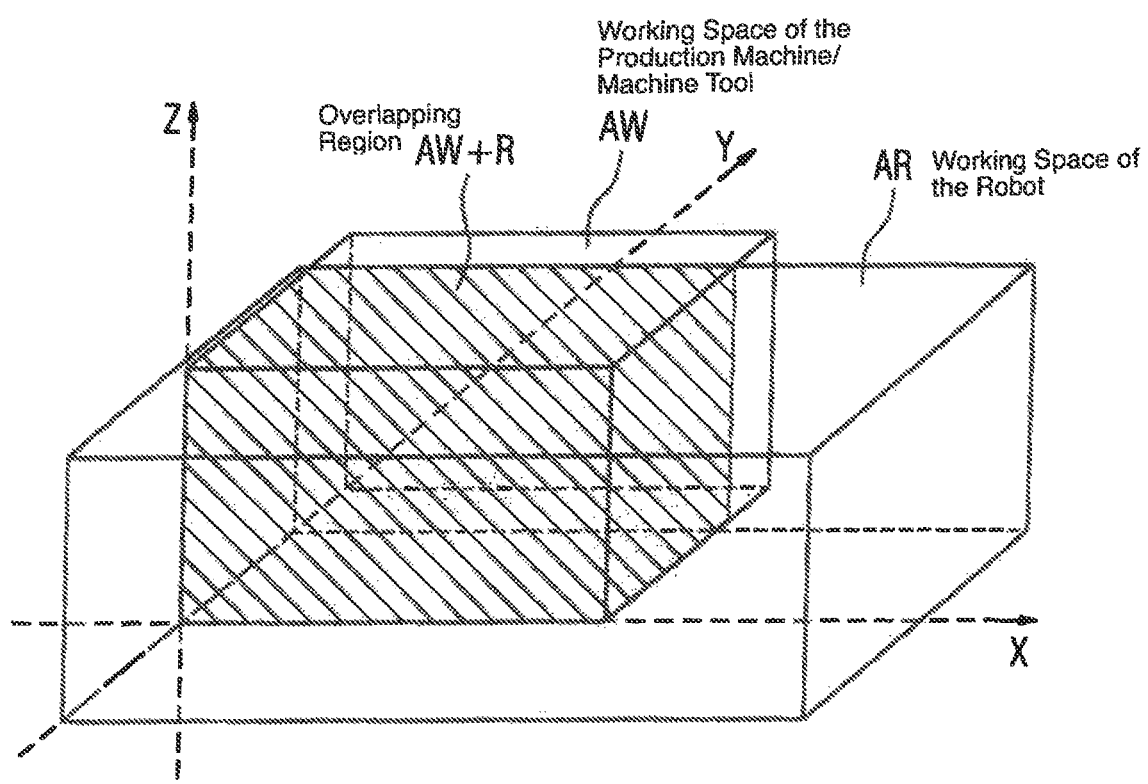
FIG. 5 shows, by way of example, a working space of the robot and a working space of the machine tool and/or production machine.

The robot 2 and the machine tool and/or production machine 4 are arranged such that a working space of the robot AR (see FIG. 5) and a working space of the machine tool and/or production machine AW at least partially overlap (see FIG. 5).

FIG. 1 further shows a workpiece 6, a tool center point (TCP) 12 of the robot.

A tool position of the robot 2 is described via its end effector. This is an imaginary reference point located at a suitable point on the tool. The reference point according to claim 1 is advantageously the TCP 12.

FIG. 1 also shows a display 16 of the machine tool and/or production machine 4. FIG. 1 shows that the workpiece 6 has already been machined in the region 18.

Machining of a workpiece 6 is achieved by cooperation between the machine tool and/or production machine 4 and the robot 2. For example, the machine tool and/or production machine 4 can be used to machine and join a workpiece 6.

The robot 2 can, for example, position the workpiece 6. The robot 2 can also be embodied for cleaning, deburring and/or polishing. The robot 2 can also perform other tasks.

The workpiece 6 can be machined simultaneously by the machine tool and/or production machine 4 and robot 2.

However, so-called joint machining with which the workpiece 6 is machined alternately by the machine tool and/or production machine 4 and the robot 2. However, simultaneous machining is also possible.

The machine tool and/or the production machine 4 is more accurate than the robot 2. A machine tool and/or production machine 4 is often at least one order of magnitude more accurate.

The robot 2 has, for example, an accuracy, in particular static accuracy, of approximately 1 mm, that of the machine tool and/or production machine 4 is approximately 10 µm.

The invention offers the advantage that the accuracy of the robot 2 in the region of the working space of the machine tool and/or production machine 4 can be increased, in particular a relative accuracy of the robot 2 in relation to the machine tool and/or production machine 4 can be significantly increased.

In this case, a slight deterioration in the accuracy of the robot 2 that may occur outside the overlapping working space of the machine tool and/or production machine 4 and the robot 2 can be quite acceptable.

Advantageously, the more accurate machine tool and/or production machine 4 serves as a measuring standard for the less accurate robot 2.

The system 10 shown in FIG. 1 shows a possible arrangement of the machine tool and/or production machine 4 and the robot 2. In this case, the robot 2 is arranged with respect to the machine tool and/or production machine 4 such that the two working spaces at least partially overlap.

However, a method outside this common working space is also possible by means of the robot 2 and the machine tool and/or production machine 4.

A plurality of points whose position is precisely known are available within the working space of the machine tool and/or production machine 4. These include, for example, a surface of a worktable and a position of a tool tip 14 and/or a spindle of the machine tool and/or production machine 4.

A tool center point of the machine tool and/or production machine 4 is advantageously arranged at the tool tip 14.

The robot 2 can approach these points. For example, by itself having a sensor probe and/or guiding a distance measuring device. For example, a position value of the tool center point 12 in space can be determined by establishing mechanical contact, for example between the tool center point 12 and the worktable.

The position value advantageously comprises three coordinates. A first coordinate advantageously defines a position value of an x-axis, a second coordinate preferably defines a position on the y-axis and a third coordinate preferably indicates a position on a z-axis.

A difference from the position values that the machine tool and/or production machine 4 measures for this point, for example by means of its own sensor probe, is considered to be an error in the robot mechanics at this point, which needs to be compensated.

The machine tool and/or the production machine 4 can be used as a measuring means for this purpose. In this case, errors that the machine tool and/or production machine 4 itself has compared to an ideal or error-free machine tool and/or production machine 4 do not have any effect because the cooperation of the robot 2 and/or the machine tool and/or production machine 4 only requires a relative accuracy of the two devices in relation to one another.

Figure 2:
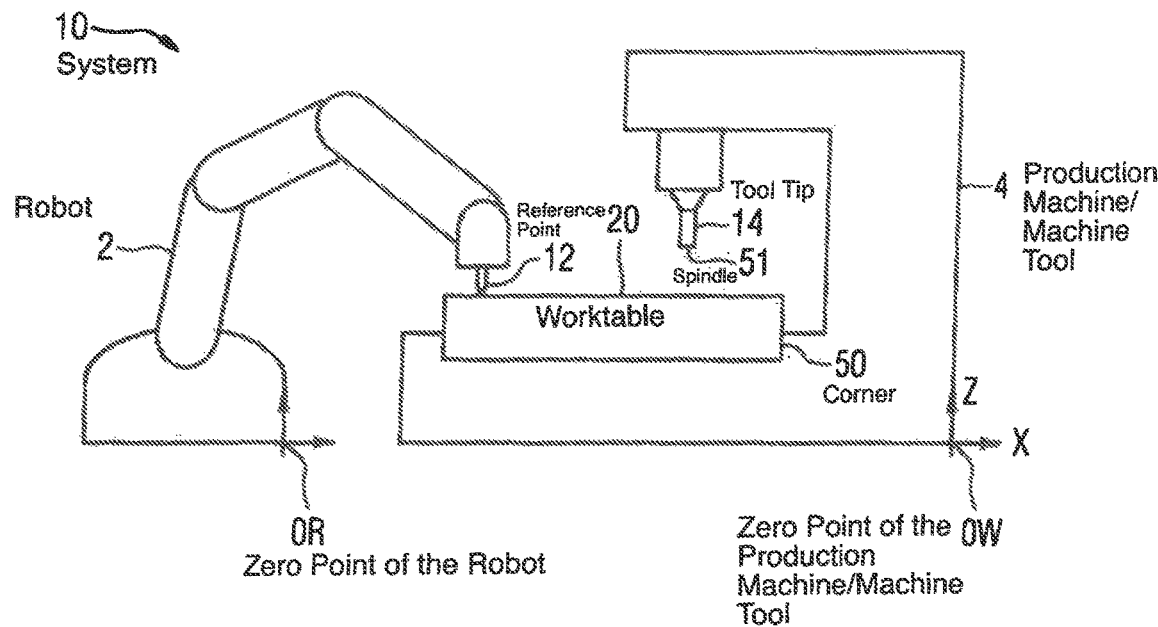
FIG. 2 shows a first possible embodiment.

FIG. 2 shows a first possible embodiment.

FIG. 2 shows the system 10 having a robot 2 and a machine tool and/or production machine 4.

FIG. 2 further shows a worktable 20, a zero point of the robot OR and a zero point of the machine tool and/or production machine OW. The tool center point 12 of the robot 2 and the tool tip 14 of the machine tool and/or production machine 4 are also identified.

In this embodiment, the robot 2 is moved until it advantageously makes mechanical contact with the worktable 20. Here, a surface of the worktable 20 can be used when comparing the two coordinate systems. Advantageously, the robot 2 approaches a plurality of positions on the surface of the worktable 20.

It is possible that a coordinate system of the robot 2 is a different coordinate system than that of the machine tool and/or production machine 4. It is then advantageous to convert position values of one coordinate system into the other.

Figure 3:
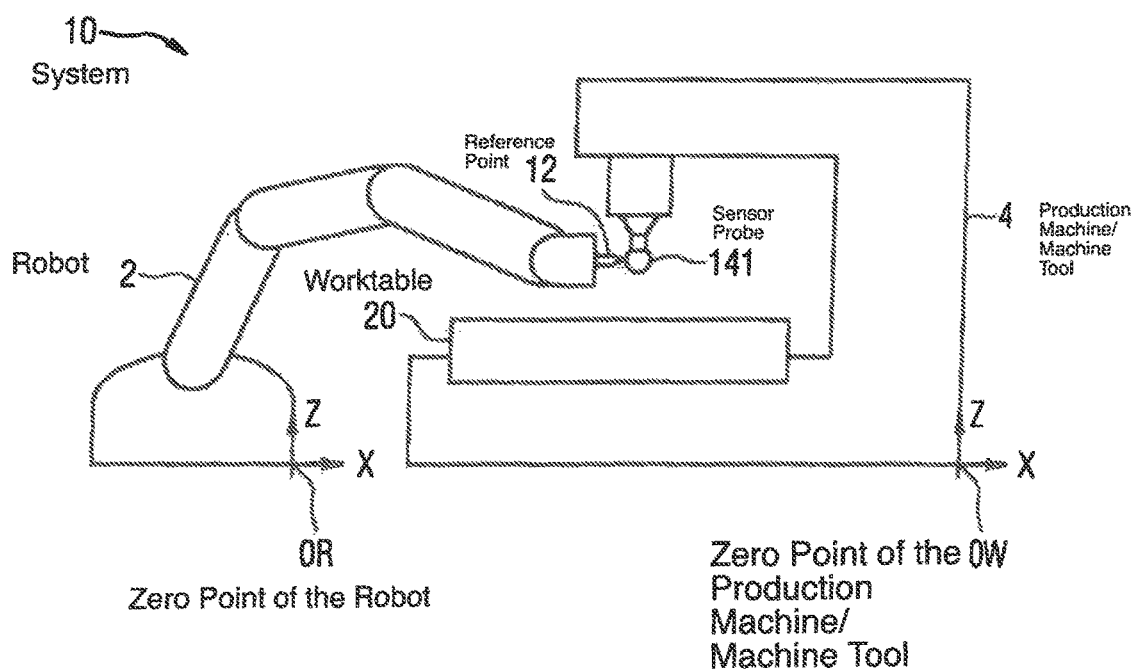
FIG. 3 shows a second possible embodiment.

FIG. 3 shows a second possible embodiment.

FIG. 3 shows that the machine tool and/or production machine 4 has a sensor probe 141. The robot 2 approaches the sensor probe 141 such that contact is made between the tool center point 12 and sensor probe 141.

In this case, a deflection of a dial gauge of the sensor probe 141 is a reference for comparing the two coordinate systems Advantageously, the tool tip 14 of the machine tool and/or production machine 4 is moved to a different position in order to effect a second comparison.

In this case as well, the robot 2 is moved such that the tool center point 12 and the sensor probe 141 are advantageously in contact. The first contact produces a first position value for the robot 2 at a first position and a first position value for the machine tool and/or production machine 4 at the position.

A comparison of the two values can identify a difference. If the two values differ, advantageously the first position value for the robot 2 is corrected such that the two position values are the same. Alternatively, the position value for the machine tool and/or production machine 4 can also be corrected.

The second position value, in particular a second corrected position value, can be ascertained in the same way. Points lying between or outside these position values can be ascertained by means of interpolation or extrapolation.

Figure 6:
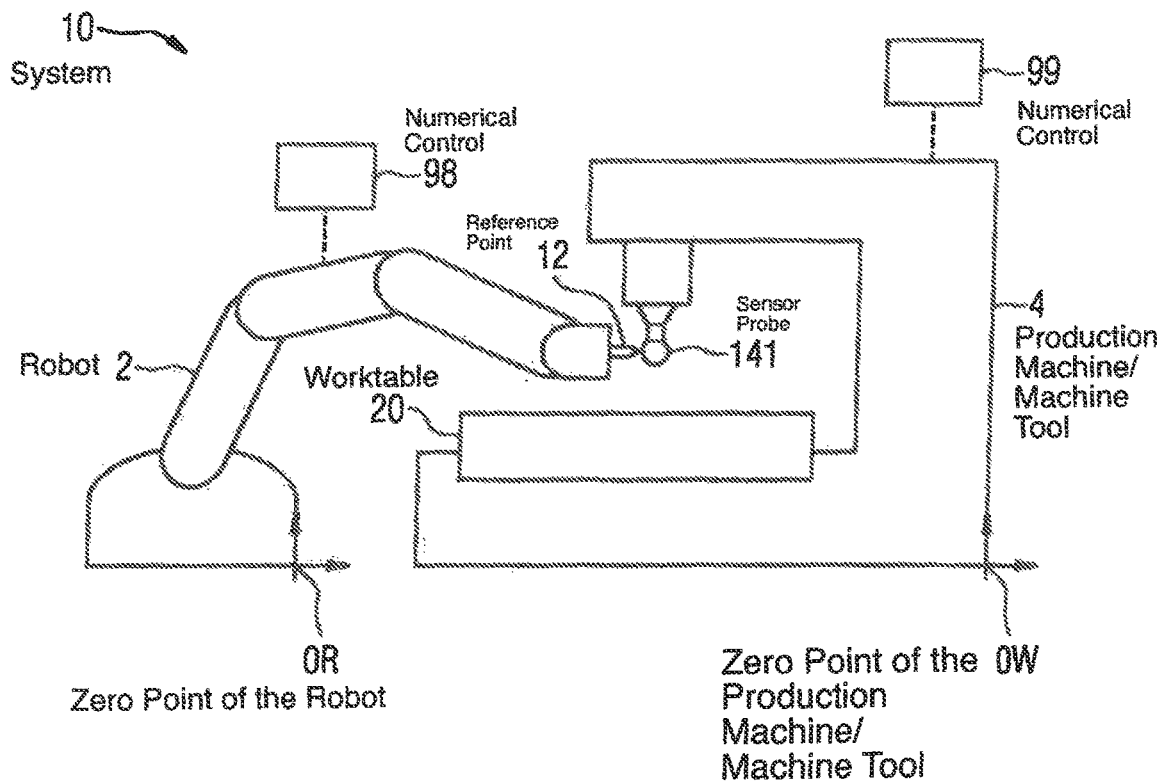
FIG. 6 and FIG. 7 show, by way of example, an assignment of numerical controls.

Advantageously, the robot 2 has a numerical control 98 (see FIG. 6).

Advantageously, the machine tool and/or production machine 4 also has a numerical control 99 (see FIG. 6).

Figure 7:
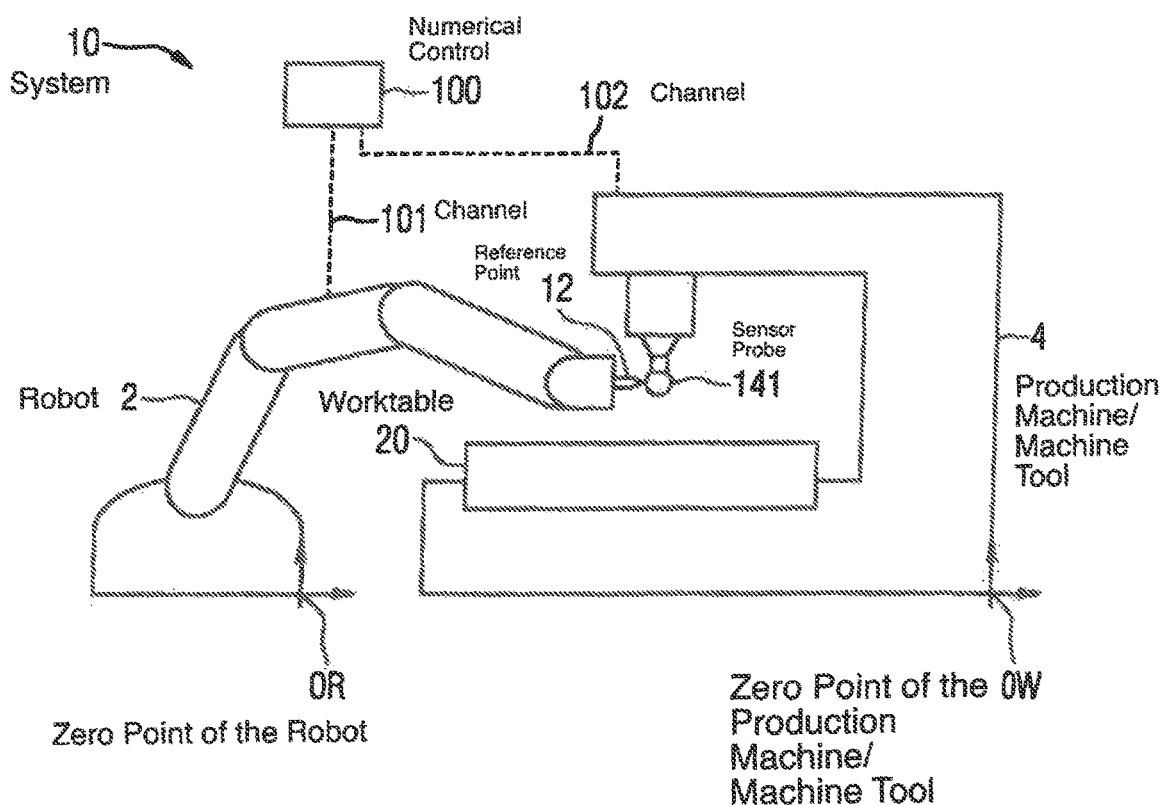

Alternatively, it is conceivable for a higher-level numerical control 100 (see FIG. 7) with two channels 101 and 102 to be available in the system 10 (see FIG. 7).

In this case, a first channel 101 is advantageously assigned to the robot 2. In this case, a second channel 102 is advantageously assigned to the machine tool and/or production machine 4.

Figure 4:
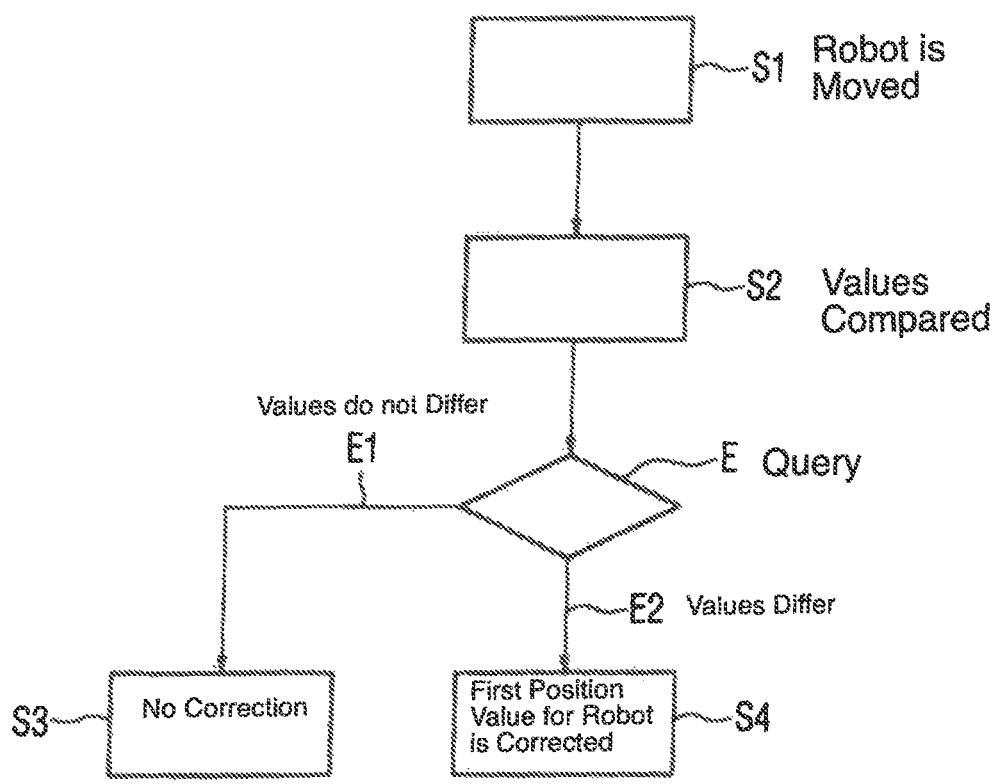
FIG. 4 shows the method according to the invention.

FIG. 4 shows the method according to the invention.

In a method step S1, the robot 2 is moved such that a reference point of the robot is located at a first position within the working space of the machine tool and/or production machine 4.

In a method step S2, a first position value for the robot 2 at the first position is compared with a first production value for the machine tool and/or production machine 4 at the position.

If the first position value for the robot 2 differs from the first position value for the machine tool and/or production machine 4 (identified by decision E2, query identified by E), the first position value for the robot 2 is corrected in method step S4.

If the values do not differ (identified by decision E1), no correction is made in method step S3.

Alternatively, the first position value for the machine tool and/or production machine 4 can also be corrected (see method step S4). However, preferably the first position value for the robot 2 is corrected because the accuracy of the machine tool and/or production machine 4 is higher.

The correction is made in such a way that the first position value for the robot 2 and the first position value for the machine tool and/or production machine 4 are the same.

FIG. 5 shows purely by way of example a working space of the robot AR and a working space AW of the machine tool and/or production machine 4. An overlapping region is identified by AW+R.

What is claimed is:

1. A method for calibrating a robot, the method comprising:
moving a robot such that a reference point of the robot is located at a first position within a working space of the machine tool and/or production machine;
comparing a first position value for the robot at the first position with a first position value for the machine tool and/or production machine at the first position; and
based on the comparing, when the first position value for the robot differs from the first position value for the machine tool and/or production machine, the first position value for the robot is corrected, or the first position value for the machine tool and/or production machine is corrected, such that the first position value for the robot and the first position value for the machine tool and/or production machine are the same, wherein a working space of the robot at least partially overlaps a working space of the machine tool and/or the production machine.

2. The method of claim 1, wherein the first position values have a first coordinate, a second coordinate, and a third coordinate.

3. The method of claim 1, further comprising:
moving the robot such that the reference point of the robot is located at a second position within the working space of the machine tool and/or production machine;
comparing a second position value for the robot at the second position with a second position value for the machine tool and/or production machine at the second position; and
based on the comparing, when the second position value for the robot differs from the second position value for the machine tool and/or production machine, the second position value for the robot is corrected or the second position value for the machine tool and/or production machine is corrected such that the second position value for the robot and the second position value for the machine tool and/or production machine are the same.

4. The method of claim 3, further comprising ascertaining a third position value by interpolation or extrapolation based on the corrected first position value for the robot or for the machine tool and/or production machine and the corrected second position value for the robot or the machine tool and/or production machine.

5. The method of claim 1, further comprising moving the robot such that the reference point of the robot is located at a plurality of positions within the working space of the machine tool and/or production machine.

6. The method of claim 5, wherein the plurality of positions are arranged in a grid-like manner and/or in an array-like manner or wherein the plurality of positions are arranged such that the positions are located at or close to critical points of a workpiece to be machined.

7. The method of claim 1, wherein the reference point of the robot is arranged at an end effector of the robot.

8. The method of claim 1, further comprising moving the robot such that the reference point of the robot is located at a position on a worktable of the machine tool and/or production machine.

9. The method of claim 8, wherein the position on the worktable is in a corner of the worktable of the machine tool and/or production machine.

10. The method of claim 1, further comprising moving the robot such that the reference point of the robot is located at a spindle of the machine tool and/or production machine.

11. The method of claim 10, further comprising detecting contact with the worktable and/or the spindle is detected by a sensor probe present on and/or in an end effector of the robot.

12. The method of claim 10, further comprising detecting contact with the spindle by a sensor probe present on and/or in the spindle.

13. A system, comprising:
a robot;
a machine tool and/or production machine arranged such that a working space of the robot at least partially overlaps a working space of the machine tool and/or production machine; and
a controller configured to move the robot such that a reference point of the robot is located at a first position within the working space of the machine tool and/or production machine; compare a first position value for the robot at the first position with a first position value for the machine tool and/or production machine at the first position; and based on the comparing, when the first position value for the robot differs from the first position value for the machine tool and/or production machine, correct the first position value for the robot, or correct the first position value for the machine tool and/or production machine, such that the first position value for the robot and the first position value for the machine tool and/or production machine are the same.

14. The system of claim 13, wherein the machine tool and/or production machine has a sensor probe and the machine tool and/or production machine is configured to function as a measuring tool.

15. The system of claim 14, wherein the machine tool and/or production machine has a spindle and the sensor probe is present on and/or in the spindle.

* * * * *